United States Patent
Zhang et al.

(10) Patent No.: US 10,772,123 B2
(45) Date of Patent: Sep. 8, 2020

(54) RANDOM ACCESS RESPONSE MESSAGE TRANSMISSION

(71) Applicant: Nokia Solutions and Networks Oy, Espoo (FI)

(72) Inventors: Yuan Tao Zhang, Beijing (CN); Yan Ji Zhang, Beijing (CN); Rapeepat Ratasuk, Hoffman Estates, IL (US); Nitin Mangalvedhe, Hoffman Estates, IL (US)

(73) Assignee: Nokia Solutions and Networks Oy, Espoo (FI)

( * ) Notice: Subject to any disclaimer, the term of this patent is extended or adjusted under 35 U.S.C. 154(b) by 75 days.

(21) Appl. No.: 15/561,937

(22) PCT Filed: Apr. 8, 2015

(86) PCT No.: PCT/US2015/024924
§ 371 (c)(1),
(2) Date: Sep. 26, 2017

(87) PCT Pub. No.: WO2016/164011
PCT Pub. Date: Oct. 13, 2016

(65) Prior Publication Data
US 2018/0132273 A1  May 10, 2018

(51) Int. Cl.
*H04W 74/00* (2009.01)
*H04L 1/18* (2006.01)
(Continued)

(52) U.S. Cl.
CPC ......... *H04W 74/004* (2013.01); *H04L 1/1887* (2013.01); *H04L 5/0053* (2013.01); *H04W 72/1268* (2013.01); *H04W 74/0833* (2013.01)

(58) Field of Classification Search
CPC ........... H04W 74/004; H04W 74/0833; H04W 72/1268; H04W 74/006; H04W 74/008;
(Continued)

(56) References Cited

U.S. PATENT DOCUMENTS 5,790,602 A     8/1998 Stephens
2010/0303013 A1  12/2010 Khandekar et al.
(Continued)

FOREIGN PATENT DOCUMENTS

RU      2468542 C2   11/2012

OTHER PUBLICATIONS

"3rd Generation Partnership Project; Technical Specification Group Radio Access Network; Evolved Universal Terrestrial Radio Access (E-UTRA); Medium Access Control (MAC) protocol specification (Release 12)", 3GPP TS 36.321, V12.4.0, Dec. 2014, pp. 1-60.
(Continued)

*Primary Examiner* — Maharishi V Khirodhar
*Assistant Examiner* — Kenneth P Hunt
(74) *Attorney, Agent, or Firm* — Harrington & Smith

(57) ABSTRACT

Systems, methods, apparatuses, and computer program products for random access procedure are provided. One method includes selecting, by a user equipment, a subframe for a first transmission of a preamble based on a configuration broadcast by an evolved node B (eNB). The method may also include repeating the preamble within a preamble repetition period based on a configuration broadcast by the eNB.

14 Claims, 7 Drawing Sheets

(51) Int. Cl.
*H04W 72/12* (2009.01)
*H04W 74/08* (2009.01)
*H04L 5/00* (2006.01)

(58) Field of Classification Search
CPC .... H04W 74/08–0891; H04W 74/0866; H04L 5/0053; H04L 1/1887
See application file for complete search history.

(56) References Cited

U.S. PATENT DOCUMENTS

| | | | |
|---|---|---|---|
| 2014/0098761 A1 | 4/2014 | Lee et al. | 370/329 |
| 2014/0161070 A1 | 6/2014 | Chang et al. | |
| 2014/0341163 A1 | 11/2014 | Zhang et al. | |
| 2014/0376483 A1 | 12/2014 | Hong et al. | |
| 2015/0117374 A1* | 4/2015 | Wu | H04W 74/0833 370/329 |
| 2016/0007377 A1* | 1/2016 | Frenne | H04W 56/001 370/329 |
| 2016/0255591 A1* | 9/2016 | Park | H04W 4/70 455/522 |
| 2016/0381712 A1* | 12/2016 | Yang | H04W 74/08 370/329 |
| 2017/0280481 A1* | 9/2017 | Stern-Berkowitz | H04W 74/008 |
| 2018/0270869 A1* | 9/2018 | Tsai | H04W 76/27 |
| 2019/0029051 A1* | 1/2019 | Lu | H04W 74/0866 |

OTHER PUBLICATIONS

"3rd Generation Partnership Project; Technical Specification Group Radio Access Network; Evolved Universal Terrestrial Radio Access (E-UTRA); Physical channels and modulation (Release 12)", 3GPP TS 36.211, V12.4.0, Dec. 2014, pp. 1-124.
"3rd Generation Partnership Project; Technical Specification Group Radio Access Network; Evolved Universal Terrestrial Radio Access (E-UTRA); Physical layer procedures (Release 12)", 3GPP TS 36.213, V12.4.0, Dec. 2014, pp. 1-225.
"3rd Generation Partnership Project; Technical Specification Group Radio Access Network; Evolved Universal Terrestrial Radio Access (E-UTRA); Radio Resource Control (RRC); Protocol specification (Release 12)", 3GPP TS 36.331 V12.4.1, Dec. 2014, pp. 1-410.
"New WI proposal: Further LTE Physical Layer Enhancements for MTC", 3GPP TSG RAN Meeting #65, RP-141660, Agenda Item: 14.1.1, Ericsson, Sep. 9-12, 2014, 9 pages.
Extended European Search Report received for corresponding European Patent Application No. 15888663.0, dated Oct. 30, 2018, 11 pages.
"RAR Transmission for MTC UEs", 3GPP TSG-RAN Working Group 1 meeting #80, R1-150065, Agenda: 7.2.1.2.2, Huawei, Feb. 9-13, 2015, 3 pages.
"Coverage Enhancement for RACH Messages", 3GPP TSG-RAN Working Group 1 meeting #76, R1-140153, Agenda: 7.2.2.2.2, Alcatel-Lucent, Feb. 10-14, 2014, 5 pages.
Office action received for corresponding Russian Patent Application No. 2017137612, dated Sep. 12, 2018, 7 pages of office action and 3 pages of office action translation available.
International Search Report and Written Opinion received for corresponding Patent Cooperation Treaty Application No. PCT/US2015/024924, dated Jul. 20, 2015, 15 pages.

* cited by examiner

RANDOM ACCESS RESPONSE MESSAGE TRANSMISSION

RELATED APPLICATION

This application was originally filed as PCT Application No. PCT/US2015/024924 filed 8 Apr. 2015.

BACKGROUND

Field

Embodiments of the invention generally relate to wireless or mobile communications networks, such as, but not limited to, the Universal Mobile Telecommunications System (UMTS) Terrestrial Radio Access Network (UTRAN), Long Term Evolution (LTE) Evolved UTRAN (E-UTRAN), LTE-Advanced (LTE-A), future 5G radio access technology, and/or High Speed Packet Access (HSPA). In particular, some embodiments may relate to random access (RA) procedure.

Description of the Related Art

Universal Mobile Telecommunications System (UMTS) Terrestrial Radio Access Network (UTRAN) refers to a communications network including base stations, or Node Bs, and for example radio network controllers (RNC). UTRAN allows for connectivity between the user equipment (UE) and the core network. The RNC provides control functionalities for one or more Node Bs. The RNC and its corresponding Node Bs are called the Radio Network Subsystem (RNS). In case of E-UTRAN (enhanced UTRAN), no RNC exists and radio access functionality is provided in the enhanced Node B (eNodeB or eNB) or many eNBs. Multiple eNBs are involved for a single UE connection, for example, in case of Coordinated Multipoint Transmission (CoMP) and in dual connectivity.

Long Term Evolution (LTE) or E-UTRAN provides a new radio access technology and refers to the improvements of UMTS through improved efficiency and services, lower costs, and use of new spectrum opportunities. In particular, LTE is a 3GPP standard that provides for uplink peak rates of at least, for example, 75 megabits per second (Mbps) per carrier and downlink peak rates of at least, for example, 300 Mbps per carrier. LTE supports scalable carrier bandwidths from 20 MHz down to 1.4 MHz and supports both Frequency Division Duplexing (FDD) and Time Division Duplexing (TDD).

As mentioned above, LTE may also improve spectral efficiency in networks, allowing carriers to provide more data and voice services over a given bandwidth. Therefore, LTE is designed to fulfill the needs for high-speed data and media transport in addition to high-capacity voice support. Advantages of LTE include, for example, high throughput, low latency, FDD and TDD support in the same platform, an improved end-user experience, and a simple architecture resulting in low operating costs.

Certain releases of 3GPP LTE (e.g., LTE Rel-10, LTE Rel-11, LTE Rel-12, LTE Rel-13) are targeted towards international mobile telecommunications advanced (IMT-A) systems, referred to herein for convenience simply as LTE-Advanced (LTE-A).

LTE-A is directed toward extending and optimizing the 3GPP LTE radio access technologies. A goal of LTE-A is to provide significantly enhanced services by means of higher data rates and lower latency with reduced cost. LTE-A is a more optimized radio system fulfilling the international telecommunication union-radio (ITU-R) requirements for IMT-Advanced while keeping the backward compatibility. One of the key features of LTE-A, introduced in LTE Rel-10, is carrier aggregation, which allows for increasing the data rates through aggregation of two or more LTE carriers, e.g., to the transmission bandwidth of up to 100 MHz. LTE-A in later releases may include even wider bandwidths as specified so far. Further, aggregating or interworking on the radio access level with the wireless LAN (ALAN) access network is foreseen.

A random access channel (RACH) refers to the shared channel which may be used by UEs to access the network for call set-up and data transmission. RACH is a transport-layer channel; the corresponding physical-layer channel is the physical random access channel (PRACH), which may be used for initial access and when the UE losses its uplink synchronization.

SUMMARY

One embodiment is directed to a method that may include selecting, by a user equipment, a subframe for a first transmission of a preamble based on a configuration broadcast by an evolved node B (eNB). The method may further include repeating the preamble within a preamble repetition period based on a configuration broadcast by the eNB.

Another embodiment is directed to an apparatus, which may include at least one processor and at least one memory comprising computer program code. The at least one memory and the computer program code are configured, with the at least one processor, to cause the apparatus at least to select a subframe for a first transmission of a preamble based on a configuration broadcast by an evolved node B (eNB), and to repeat the preamble within a preamble repetition period based on a configuration broadcast by the eNB.

Another embodiment is directed to an apparatus that may include selecting means for selecting a subframe for a first transmission of a preamble based on a configuration broadcast by an evolved node B (eNB), and repeating means for repeating the preamble within a preamble repetition period based on a configuration broadcast by the eNB.

Another embodiment is directed to a method that may include detecting, by a network node, a potential preamble only from physical random access channel (PRACH) occasion. The method may further include combining repetitions of the preamble within a repetition period based on a pattern broadcast by the network node.

Another embodiment is directed to an apparatus, which may include at least one processor and at least one memory comprising computer program code. The at least one memory and the computer program code are configured, with the at least one processor, to cause the apparatus at least to detect a potential preamble only from physical random access channel (PRACH) occasion, and to combine repetitions of the preamble within a repetition period based on a pattern broadcast by the network node.

Another embodiment is directed to an apparatus that may include detecting means for detecting a potential preamble only from physical random access channel (PRACH) occasion, and combining means for combining repetitions of the preamble within a repetition period based on a pattern broadcast by the network node.

BRIEF DESCRIPTION OF THE DRAWINGS

For proper understanding of the invention, reference should be made to the accompanying drawings, wherein.

DETAILED DESCRIPTION

Figure 1:
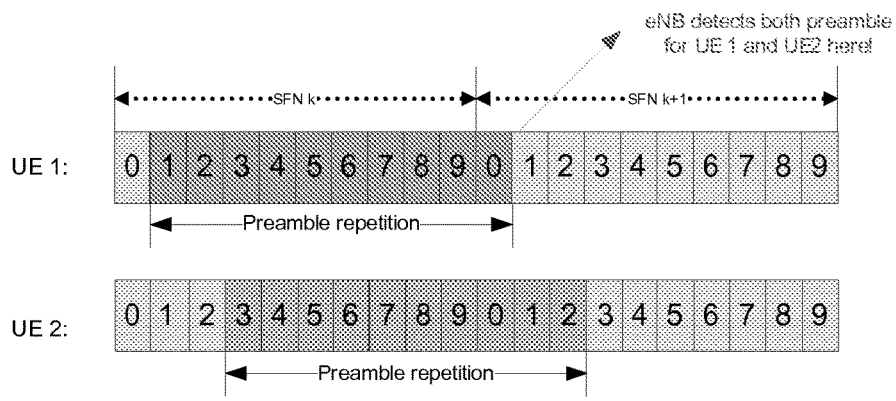
FIG. 1 illustrates a diagram depicting an example of eNB detection of a preamble ID before the end of a repetition period.

It will be readily understood that the components of the invention, as generally described and illustrated in the figures herein, may be arranged and designed in a wide variety of different configurations. Thus, the following detailed description of embodiments of systems, methods, apparatuses, and computer program products for random access response (RAR) message transmission, as represented in the attached figures, is not intended to limit the scope of the invention, but is merely representative of some selected embodiments of the invention.

The features, structures, or characteristics of the invention described throughout this specification may be combined in any suitable manner in one or more embodiments. For example, the usage of the phrases "certain embodiments," "some embodiments," or other similar language, throughout this specification refers to the fact that a particular feature, structure, or characteristic described in connection with the embodiment may be included in at least one embodiment of the present invention. Thus, appearances of the phrases "in certain embodiments," "in some embodiments," "in other embodiments," or other similar language, throughout this specification do not necessarily all refer to the same group of embodiments, and the described features, structures, or characteristics may be combined in any suitable manner in one or more embodiments.

Additionally, if desired, the different functions discussed below may be performed in a different order and/or concurrently with each other. Furthermore, if desired, one or more of the described functions may be optional or may be combined. As such, the following description should be considered as merely illustrative of the principles, teachings and embodiments of this invention, and not in limitation thereof.

In order to obtain uplink (UL) synchronization or request UL radio resources, a UE may initiate a random access (RA) procedure by sending a random preamble or an eNB allocated preamble and wait for the RA response scheduled by Physical Downlink Control Channel (PDCCH) identified by random access radio network temporary identifier (RA-RNTI) within a certain time. The RA-RNTI may be defined using the following equation (as in 3GPP TS 36.321): RA-RNTI=1+t_id+10*f_id, where t_id is the index of the first subframe of the specified PRACH (0<=t_id<10), and fid is the index of the specified PRACH within that subframe, in ascending order of frequency domain (0<=f_id<6). For FDD, f_id may be fixed to be 0 since there is a single PRACH resource.

3GPP Rel-13 includes a work item entitled "Further LTE Physical Layer Enhancements for MTC" (RP-141660). A purpose of this work item is to specify a new low-complexity UE for machine-type communications (MTC) operation in LTE, to support coverage enhancement (CE) for both Rel-13 low-complexity UE and UE operating in CE compared to existing LTE networks. Rel-13 MTC UE only needs to support 1.4 MHz (i.e., only 6 physical resource block (PRB) pairs) RF bandwidth in downlink and uplink within any system bandwidth. The Rel-13 MTC work item also aims to specify techniques that can achieve 15 dB coverage improvement for FDD, for example, in the use cases where MTC devices are deployed in challenging locations, such as deep inside buildings. These techniques may include, but are not limited to, e.g., subframe bundling techniques with hybrid automatic repeat request (HARQ) for physical data channels, resource allocation using enhanced PDCCH (EPDCCH) with cross-subframe scheduling with repetition, and so on. The amount of coverage enhancement may be configured per cell, per UE, per channel, and/or per group of channels. The Rel-13 MTC work item also aims to provide power consumption reduction schemes, both in normal coverage and enhanced coverage, to target ultra-long battery life.

In order to support random access procedure for UE in CE mode, RAN1 #79 has agreed that coverage enhancement of PRACH (RACH message 1) may be achieved through repetition of the legacy PRACH formats. Multiple PRACH repetition levels will be supported. RAN1 has also agreed as a working assumption that the maximum number of levels is 3 (i.e., 4 if the case without repetition is included). The number of levels should be configurable by eNB up to the maximum number.

RAN1 has also agreed to define one or more additional PRACH time/frequency resource regions for UEs operating CE, apart from the regions for the legacy PRACH configuration. Within such regions, code multiplexing of UEs will be possible through allocation of different PRACH preamble sequence groups to UEs with different repetition levels. Other details are for further study.

And, in RAN1 #80, the following agreements were achieved. For coverage enhancement of PRACH, for initial random access: there is one to one mapping between PRACH repetition level and PRACH resource set, multiple attempts are allowed for each PRACH repetition level, there is a configurable number of attempts (for further study: whether the configuration of the number of attempts is common or separate per repetition level), number of attempts per PRACH repetition level can be different, if UE does not receive a RAR after the allowed number of attempts then it moves to the next higher repetition level, specified maximum numbers of levels is 3 (this does not include "zero coverage extension"). Remaining for further study is power ramping or always max power used within each repetition level, and UE behavior when UE receives RAR but fails contention resolution.

In legacy random access procedure, after the UE transmits a PRACH preamble, the UE expects to receive PDCCH for scheduling RAR within a time window. For coverage enhancement MTC UEs, the PRACH needs to repeat multiple times depending on the specific coverage enhancement requirement. With legacy PRACH configurations, it is very probable that the starting subframe for one PRACH happens in the middle of the previous PRACH repetition and may lead to the mismatched RA-RNTI derivation between the UE and eNB according to the equation defined by the 3GPP specification.

FIG. 1 illustrates an example block diagram depicting preamble detection, according to an embodiment. In particular, FIG. 1 illustrates an example where the eNB detects a preamble ID before end of repetition. In this example, it is supposed that the repetition number of preamble is 10 and the eNB set the PRACH configuration index to 13, which means the UE could select subframe number #1, #3, #5, #7 and #9 as the PRACH occasion for sending the initial transmission of the preamble. For example, UE1 chooses to transmit the preamble from subframe #1 of system frame number (SFN) # k and the preamble repetitions for UE1 are transmitted at the following available subframes. Meanwhile, the UE 2 transmits the preamble initially from subframe #3 of SFN #0. Then, the eNB may detect both preambles transmitted from UE1 and UE2 in the end of preamble repetitions of UE1. In this case, the eNB is not able to understand when the initial transmission of the preambles for UE2 and UE1 starts from. The eNB may think the repetition of UE2 is from subframe #0 of SFN #1 and assign incorrect RA-RNTI for UE2, however UE2 is actually expecting RA-RNTI derived from subframe #3.

Figure 2:
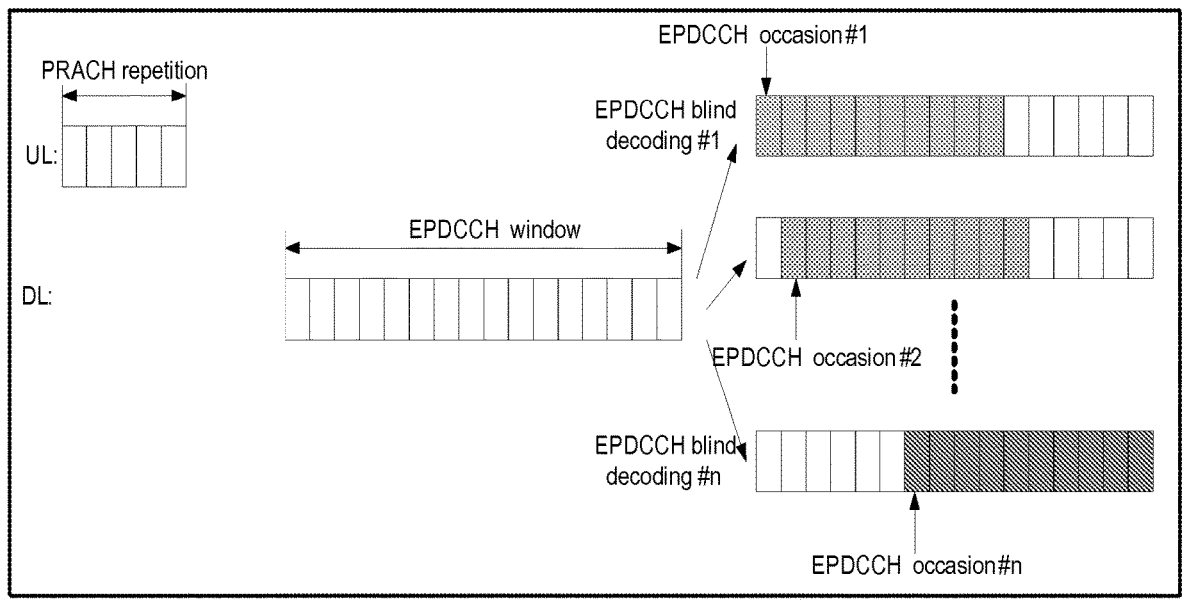
FIG. 2 illustrates a diagram depicting an example EPD-CCH window and resulting blind detection.

In addition, as defined in current 3GPP specifications, the start and end of the RAR window are configured by the eNB. A typical delay between the end of the preamble subframe and the first subframe in RAR window may be 3 ms. For coverage enhancement MTC UEs, if the legacy scheme is followed and a time window is defined for a UE to detect scheduling downlink control information (DCI) (for scheduling RAR), the UE may need to take multiple subframes in the window as the starting subframe and correspondingly do multiple blind decodings. Besides, UEs may need to buffer EPDCCH soft bits for each blind detection in order to enable blind detection. FIG. 2 illustrates one example for the EPDCCH blind decoding. It is observed that this kind of scheme not only causes high power consumption for EPDCCH detection, but also needs higher buffer size at the UE side.

In view of the above, certain embodiments introduce a PRACH repetition periodicity which does not rely on the existing PRACH configuration index. The approaches provided by embodiments of the invention are more flexible and result in a complete solution for the whole RA procedure together with the proposed EPDCCH repetition pattern.

Embodiments provide an enhanced PRACH approach to avoid a potential misunderstanding of the RA-RNTI, and to avoid extra UE power consumption and UE implementation complexity.

As agreed by 3GPP RAN1, it is likely that there will be multiple coverage enhancement levels in one cell, and there might be one to one mapping between the different repetition level and PRACH resource set, and therefore some embodiments are directed to the PRACH configuration and how to detect EPDCCH for receiving RAR for UE in CE mode.

Certain embodiments provide an enhanced PRACH occasion configuration for UE in coverage enhancement mode. For example, in one embodiment, new PRACH resource configurations are introduced for Rel-13 MTC UEs, which define the subframe offset of the region-specific PRACH occasion (i.e., the starting subframe for PRACH) and the periodicity of PRACH occasion. This periodicity restricts the highest repetition level this PRACH region supports.

In some embodiments, separate PRACH resource configuration may be provided for Rel-13 low cost MTC UEs, UEs in enhanced coverage (separate configuration per coverage enhancement level), and legacy UEs in normal coverage.

Figure 3:
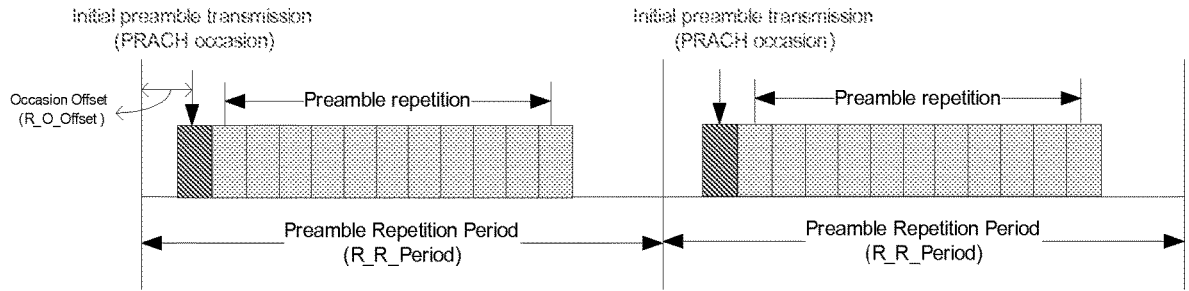
FIG. 3 illustrates an example depicting consecutive preamble repetition.
Figure 4:
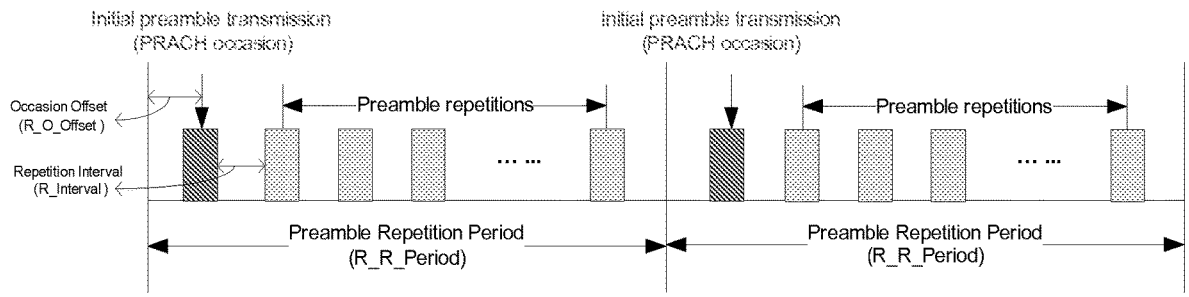
FIG. 4 illustrates an example depicting preamble repetition at predefined intervals.

Within the repetition period, after the PRACH occasion, the preamble may be repeated either consecutively at each subsequent subframes, or at specific subframes regularly with predefined interval. FIG. 3 illustrates an example depicting consecutive preamble repetition; and FIG. 4 illustrates an example depicting preamble repetition at predefined intervals. The periodicity of the PRACH occasion may ensure the required number of preamble repetition within the preamble repetition period (The whole preamble transmission occurs within the preamble repetition period).

In an embodiment, the preamble repetition periodicity and the PRACH occasion may be mapped to the repetition level, and those configurations may be broadcasted by system information.

According to certain embodiments, PRACH occasion may satisfy the following equations:

$$R\_R\_Period >= CEILING(\text{repetition number of preamble} * R\_Interval/10, 1), (\text{for consecutive repetition transmission, repetition interval}=1)$$

$$R\_SFN \bmod R\_R\_Period = R\_O\_Offset,$$

where $R\_SFN$ is the system frame number of the frame where the PRACH occasion occurs, $R\_R\_Period$ is preamble repetition period (n1, n2, . . . nX) (n1=1 frame, n2=2 frames, . . . nX=X frames), $R\_O\_Offset$ is the PRACH occasion Offset, (0-9), the subframe within the system frame of the PRACH occasion (i.e., the initial preamble transmission), $R\_interval$ is the interval between the preamble repetitions (n1, n2, . . . nX) (n1=1subframe, n2=2 subframes, . . . nX=X subframes)

In addition to the time-domain configuration defined above, frequency resource selection and frequency hopping pattern may be defined. In one embodiment, the frequency hopping pattern may be based on the PRACH repetition index, a subframe index, or the SFN. In another embodiment, there is a separate PRACH resource configuration for Rel-13 low cost MTC UEs and for UEs in enhanced coverage (separate configuration per coverage enhancement level).

According to another embodiment, there is a common PRACH resource configuration for Rel-13 low cost MTC UEs and for UEs in enhanced coverage. Configurations may be distinguished through different starting subframes or different preamble groups.

Figure 5:
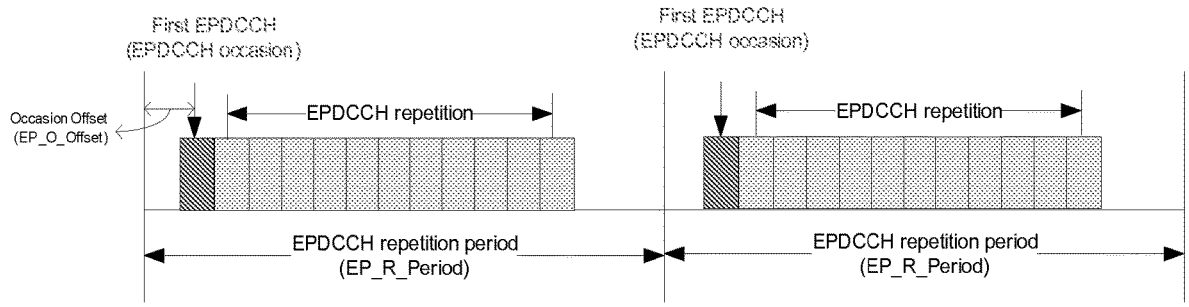
FIG. 5 illustrates an example depicting EPDCCH repetitions, according to an embodiment.

Embodiments may also provide enhanced EPDCCH (for scheduling RAR) transmission configuration for UE in coverage enhancement mode. In a first embodiment of the enhanced EPDCCH configuration, the configuration of EPDCCH scheduling RAR may include the subframe offset of the region-specific EPDCCH occasion (i.e., the starting subframe for EPDCCH), the periodicity of EPDCCH occasion, and EPDCCH repetition level. FIG. 5 illustrates an example depicting EPDCCH repetitions, according to an embodiment. It should be noted that EPDCCH as discussed herein is intended to refer to an example of a physical downlink control channel associated with MTC. Embodiments of the invention are not limited to EPDCCH and are equally applicable to any physical downlink control channel associated with MTC, whether referred to as EPDCCH or by another name.

The periodicity of the EPDCCH occasion may ensure the required number of EPDCCH repetition within the EPDCCH repetition period. The EPDCCH repetition periodicity and the EPDCCH occasion may be mapped to the repetition level, and that configuration may be broadcasted by system information.

In this embodiment, EPDCCH occasion may satisfy the following equations:

$$EP\_R\_Period >= CEILING(\text{repetition number of EPDCCH}/10,1)$$

$$P\_SFN \bmod EP\_R\_Period = EPO\_O\_Offset,$$

where P_SFN is the system frame number of the frame where the EPDCCH occasion occurs, EP_R_Period is EPDCCH repetition period (n1, n2, ... nX) (n1=1 frame, n2=2 frames, ... nX=X frames), EP_O_Offset is EPDCCH occasion Offset, (0-9), the subframe within the system frame of the EPDCCH occasion.

It should be noted that the EPDCCH enhancement is not only limited to schedule RAR message, and could also be applied to other types of messages, for example, for scheduling the RRC signalling during the connection setup procedure. After the UE establishes the connection with the network, control signaling/user data transmission could be scheduled by the enhanced periodical EPDCCH as well, where the parameters applied could be UE specific and configured via dedicated signaling.

Figure 6:
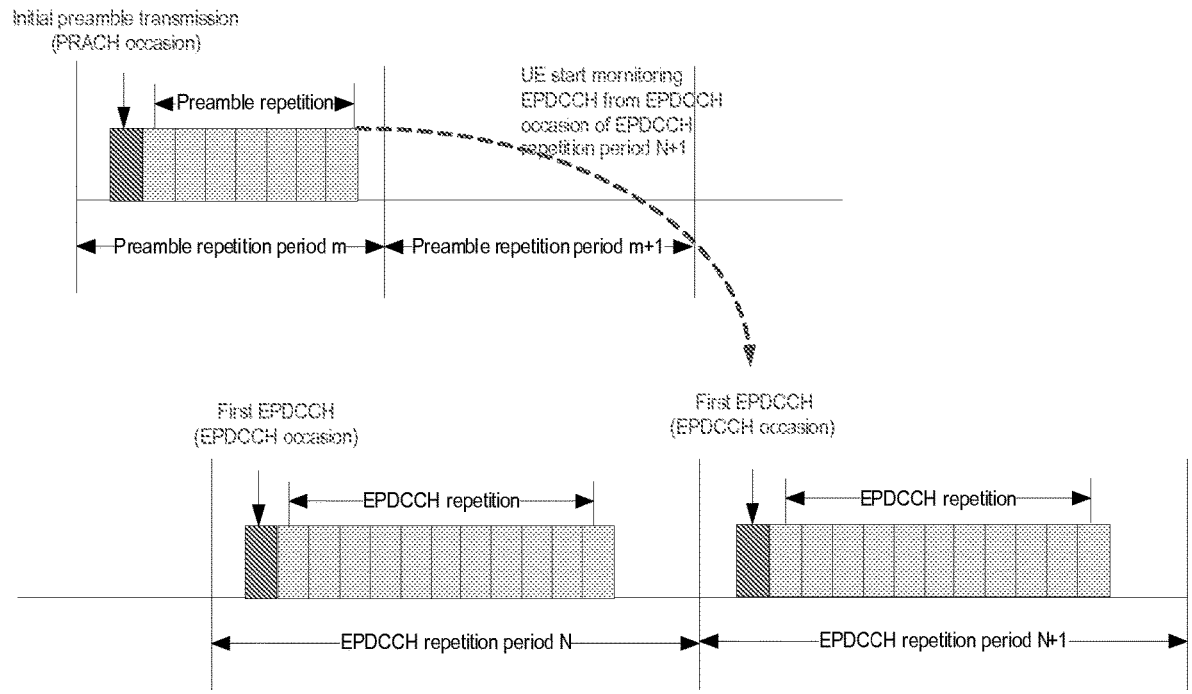
FIG. 6 illustrates an example mapping between PRACH occasion and EPDCCH occasion, according to an embodiment.

After the UE transmits a PRACH preamble within a preamble repetition period m, the UE may start monitoring EPDCCH from the EPDCCH occasion that is nearest to, and follows, the last subframe of the PRACH repetition period m. If the UE could not receive EPDCCH within the nearest EPDCCH period, then it may initiate another RA attempt. FIG. 6 illustrates an example mapping between PRACH occasion and EPDCCH occasion, according to an embodiment.

Figure 8:
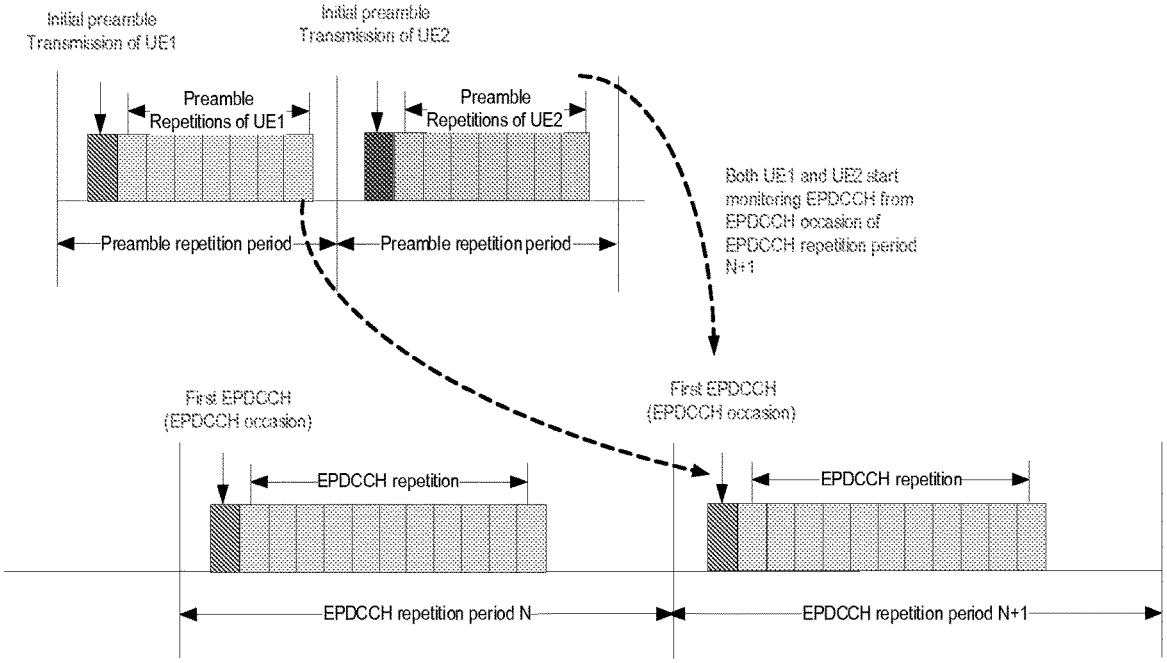
FIG. 8 illustrates an example of multiple PRACH occasions mapped to the same EPDCCH occasion for an embodiment of the invention.

If multiple PRACH occasions are mapped to the same EPDCCH occasion, as illustrated in FIG. 8 discussed below, the RA-RNTI (following legacy scheme) deduced for each PRACH will be the same. Thus, even if two UEs transmit the same preamble from different PRACH occasions, the eNB cannot use RA-RNTI to identify the time from which each PRACH transmits due to same PRACH occasion offset, and has to trigger contention resolution procedure. This kind of contention resolution procedure is unnecessary and embodiments provide two alternatives to avoid it.

In a first alternative, a new RA-RNTI definition is introduced according to the following equation:

$$RA\text{-}RNTI = 1 + L\_id + 10 * f\_id,$$
$$(1 <= L\_id <= EP\_R\_Period/R\_R\_Period),$$

where R_R_Period is the preamble repetition period (n1, n2, ... nX) (n1=1 frame, n2=2 frames, ... nX=X frames), EP_R_Period is the EPDCCH repetition period (n1, n2, ... nX) (n1=1 frame, n2=2 frames, ... nX=X frames), f_id is the number of PRACH regions that map to the same EPDCCH region, and L_id is the index of each PRACH occasion that maps to the same EPDCCH region.

Correspondingly, a new search space for UE monitoring the EPDCCH may be defined by: the lowest aggregation level=24/D; the aggregation levels for UE to monitor is {24/D, (24/D)*2, ..., (24/D)*D}; and number of decoding candidates=D, where D is the number of PRACH occasions that map to the same EPDCCH.

In a second alternative, a new RA-RNTI definition scheme is introduced, such that the RA-RNTI for coverage enhancement UEs is defined specific to each EPDCCH region, i.e., there is a single RA-RNTI predefined for each EPDCCH region. In this embodiment, the DCI scrambled by RA-RNTI is always transmitted in whole 6PRB pairs in the EPDCCH region.

According to one embodiment, a new item in RAR is introduced that indicates for each detected preamble ID, the PRACH occasion from which (or which PRACH end subframe) the eNB detects this ID. Table 1 below provides an example.

TABLE 1

Indicating of PRACH occasion in RAR

| Detected preamble ID | Corresponding PRACH occasion |
|---|---|
| Preamble ID #1 | PRACH occasion #0 |
| Preamble ID #1 | PRACH occasion #1 |
| Preamble ID #2 | PRACH occasion #1 |

If there are multiple PRACH regions attached to same EPDCCH region, the RAR message may also indicate in which PRACH region a specific preamble ID is detected.

Figure 7:
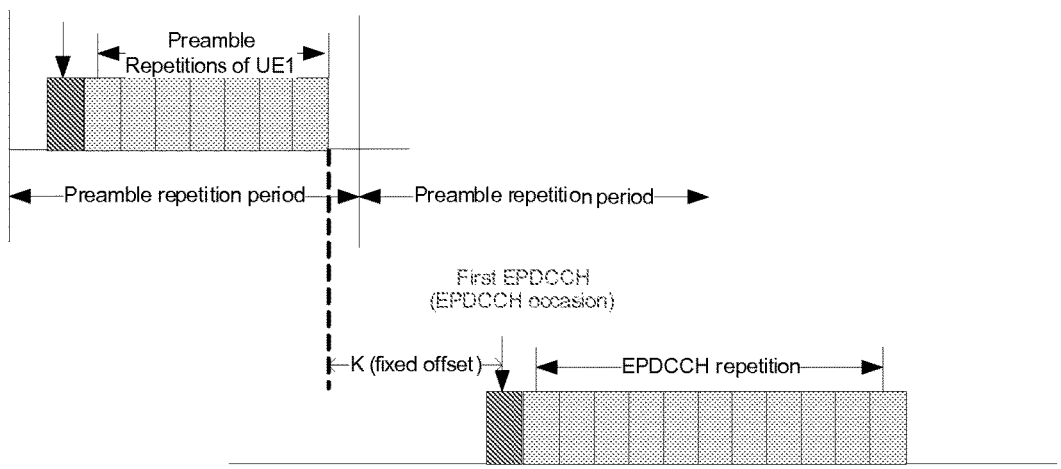
FIG. 7 illustrates an example enhanced EPDDCH configuration for an embodiment of the invention.

In a second embodiment of the enhanced EPDCCH configuration, the EPDCCH occasion always starts on the subframe after the K subframes from the end of the PRACH preamble transmission, where the K is a fixed offset that may be predefined in 3GPP specification or broadcasted by system information. FIG. 7 illustrates an example enhanced EPDDCH configuration for this second embodiment.

In another embodiment, the EPDCCH occasions may be configured using an EPDCCH period and a number of EPDCCH occasions. For example, the first EPDCCH occasion starts at a fixed offset from the end of the PRACH preamble transmission. There are N number of EPDCCH occasions, each separated by an EPDCCH period.

In another embodiment, the EPDCCH repetition number is based on the PRACH preamble repetition number. In yet another embodiment, the EPDCCH period is determined by the EPDCCH repetition number and an offset. In another embodiment, the offset is based on the processing time at the UE.

According to one embodiment, enhanced RA-RNTI derivation for Rel-13 UE in CE mode, the existing RA-RNTI computation could be re-formulated as:

For Enhanced EPDCCH configuration option 1 where the configuration of EPDCCH scheduling RAR includes the subframe offset of the region-specific EPDCCH occasion, the periodicity of EPDCCH occasion, and EPDCCH repetition level:

$$RA\text{-}RNTI = 1 + L\_id + 10 * f\_id,$$
$$(1 <= L\_id <= EP\_R\_Period/R\_R\_Period),$$

For Enhanced EPDCCH configuration option 2 where the EPDCCH occasion starts always on the subframe after the K subframes from the end of the PRACH preamble transmission:

$$\text{RA-RNTI}=1+SFN\_PRACH/R\_R\_Period+10*f\_id,$$

where SFN_PRACH is the system frame number of the frame at which PRACH occasion occurs, R_R_Period is the preamble repetition period (n1, n2, . . . nX) (n1=1 frame, n2=2 frames, . . . nX=X frames), EP_R_Period is the EPDCCH repetition period (n1, n2, . . . nX) (n1=1 frame, n2=2 frames, . . . nX=X frames), f_id is the number of PRACH regions that map to the same EPDCCH region, L_id is the index of each PRACH occasion that maps to the same EPDCCH region.

Alternatively, the RA-RNTI may be defined specific to each EPDCCH region, i.e., there is a single RA-RNTI predefined for each EPDCCH region. A new item in RAR may be introduced that indicates for each detected preamble ID, the PRACH occasion from which (or which PRACH end subframe) the eNB detects this ID.

Figure 9:
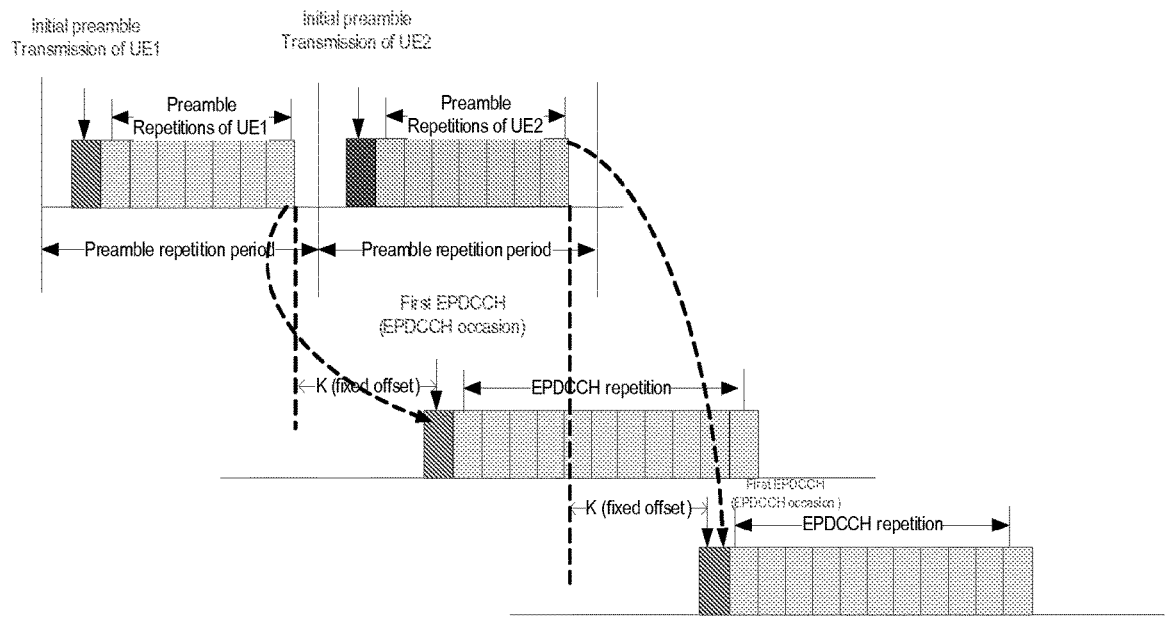
FIG. 9 illustrates EPDCCH transmission overlap for an embodiment.

FIG. 8 illustrates an example of multiple PRACH occasions mapped to the same EPDCCH occasion for option 1 where the configuration of EPDCCH scheduling RAR includes the subframe offset of the region-specific EPDCCH occasion, the periodicity of EPDCCH occasion, and EPDCCH repetition level. FIG. 9 illustrates EPDCCH transmission overlap for option 2 where the EPDCCH occasion starts always on the subframe after the K subframes from the end of the PRACH preamble transmission.

Figure 10A:
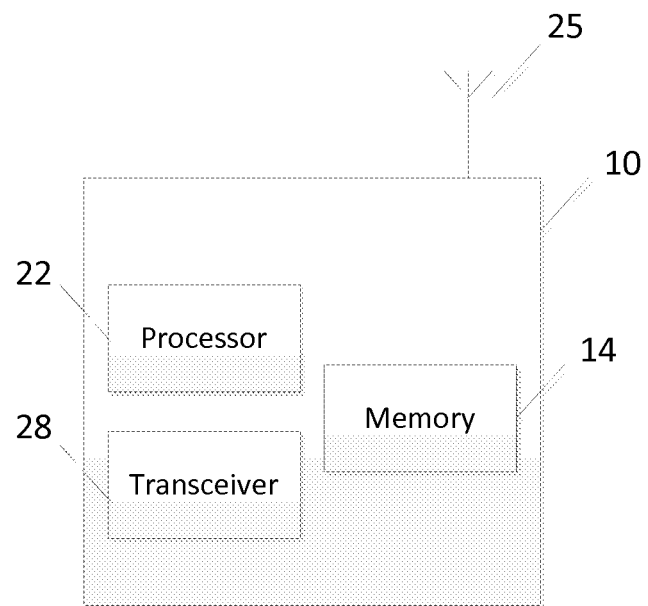
FIG. 10a illustrates a block diagram of an apparatus according to one embodiment.

FIG. 10a illustrates an example of an apparatus 10 according to an embodiment. In an embodiment, apparatus 10 may be a node, host, or server in a communications network or serving such a network. For example, in certain embodiments, apparatus 10 may be a network node or access node for a radio access network, such as a base station in UMTS or eNB in LTE or LTE-A. However, in other embodiments, apparatus 10 may be other components within a radio access network. It should be noted that one of ordinary skill in the art would understand that apparatus 10 may include components or features not shown in FIG. 10a.

As illustrated in FIG. 10a, apparatus 10 includes a processor 22 for processing information and executing instructions or operations. Processor 22 may be any type of general or specific purpose processor. While a single processor 22 is shown in FIG. 10a, multiple processors may be utilized according to other embodiments. In fact, processor 22 may include one or more of general-purpose computers, special purpose computers, microprocessors, digital signal processors (DSPs), field-programmable gate arrays (FPGAs), application-specific integrated circuits (ASICs), and processors based on a multi-core processor architecture, as examples.

Apparatus 10 may further include or be coupled to a memory 14 (internal or external), which may be coupled to processor 22, for storing information and instructions that may be executed by processor 22. Memory 14 may be one or more memories and of any type suitable to the local application environment, and may be implemented using any suitable volatile or nonvolatile data storage technology such as a semiconductor-based memory device, a magnetic memory device and system, an optical memory device and system, fixed memory, and removable memory. For example, memory 14 can be comprised of any combination of random access memory (RAM), read only memory (ROM), static storage such as a magnetic or optical disk, or any other type of non-transitory machine or computer readable media. The instructions stored in memory 14 may include program instructions or computer program code that, when executed by processor 22, enable the apparatus 10 to perform tasks as described herein.

In some embodiments, apparatus 10 may also include or be coupled to one or more antennas 25 for transmitting and receiving signals and/or data to and from apparatus 10. Apparatus 10 may further include or be coupled to a transceiver 28 configured to transmit and receive information. For instance, transceiver 28 may be configured to modulate information on to a carrier waveform for transmission by the antenna(s) 25 and demodulate information received via the antenna(s) 25 for further processing by other elements of apparatus 10. In other embodiments, transceiver 28 may be capable of transmitting and receiving signals or data directly.

Processor 22 may perform functions associated with the operation of apparatus 10 which may include, for example, precoding of antenna gain/phase parameters, encoding and decoding of individual bits forming a communication message, formatting of information, and overall control of the apparatus 10, including processes related to management of communication resources.

In an embodiment, memory 14 may store software modules that provide functionality when executed by processor 22. The modules may include, for example, an operating system that provides operating system functionality for apparatus 10. The memory may also store one or more functional modules, such as an application or program, to provide additional functionality for apparatus 10. The components of apparatus 10 may be implemented in hardware, or as any suitable combination of hardware and software.

In one embodiment, apparatus 10 may be a network node or access node, such as a base station in UMTS or an eNB in LTE or LTE-A, for example. Apparatus 10 may be controlled by memory 14 and processor 22 to detect a potential preamble only from the PRACH occasion, and to combine repetitions of the preamble within a repetition period based on a pattern broadcast by apparatus 10. According to an embodiment, apparatus 10 may be further controlled by memory 14 and processor 22 to start to send EPDCCH for scheduling a RAR message from the EPDCCH occasion even if apparatus 10 can decode the preamble successfully before receiving a required number of preamble repetitions.

In an embodiment, when multiple PRACH occasions are mapped to a same EPDCCH occasion, apparatus 10 may be further controlled by memory 14 and processor 22 to send separate EPDCCH identified by different RA-RNTI according to the following equation: RA-RNTI=1+L_id+10*f_id, such that 1<=L_id<=EP_R_Period/R_R_Period, where R_R_Period is preamble repetition period, EP_R_Period is EPDCCH repetition period, f_id is the number of PRACH regions that map to the same EPDCCH region, and L_id is the index of each PRACH occasion that maps to the same EPDCCH region.

According to another embodiment, when there is any overlap among the EPDCCH transmissions corresponding to the preamble transmission of different user equipment, apparatus 10 may be further controlled by memory 14 and processor 22 to send separate EPDCCH identified by different RA-RNTI. The RA-RNTI may be calculated according to the following equation: RA-RNTI=1+SFN_PRACH/R_R_Period+10*f_id, where SFN_PRACH is the system frame number of the frame at which PRACH occasion occurs, R_R_Period is the preamble repetition period (n1, n2, . . . nX) (n1=1 frame, n2=2 frames, . . . nX=X frames), and f_id is the number of PRACH regions that map to the same EPDCCH region.

Figure 10B:
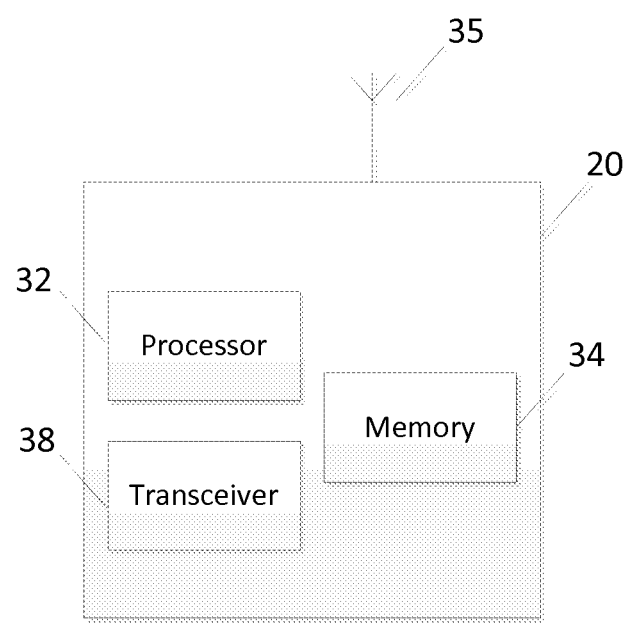
FIG. 10b illustrates a block diagram of an apparatus according to another embodiment.

FIG. 10b illustrates an example of an apparatus 20 according to another embodiment. In an embodiment, apparatus 20 may be a node or element in a communications network or associated with such a network, such as a UE, mobile device, mobile unit, a machine type UE or other device. For instance, in some embodiments, apparatus 20 may be UE in LTE or LTE-A. It should be noted that one of ordinary skill in the art would understand that apparatus 20 may include components or features not shown in FIG. 10b.

As illustrated in FIG. 10b, apparatus 20 includes a processor 32 for processing information and executing instructions or operations. Processor 32 may be any type of general or specific purpose processor. While a single processor 32 is shown in FIG. 10b, multiple processors may be utilized according to other embodiments. In fact, processor 32 may include one or more of general-purpose computers, special purpose computers, microprocessors, digital signal processors (DSPs), field-programmable gate arrays (FPGAs), application-specific integrated circuits (ASICs), and processors based on a multi-core processor architecture, as examples.

Apparatus 20 may further include or be coupled to a memory 34 (internal or external), which may be coupled to processor 32, for storing information and instructions that may be executed by processor 32. Memory 34 may be one or more memories and of any type suitable to the local application environment, and may be implemented using any suitable volatile or nonvolatile data storage technology such as a semiconductor-based memory device, a magnetic memory device and system, an optical memory device and system, fixed memory, and removable memory. For example, memory 34 can be comprised of any combination of random access memory (RAM), read only memory (ROM), static storage such as a magnetic or optical disk, or any other type of non-transitory machine or computer readable media. The instructions stored in memory 34 may include program instructions or computer program code that, when executed by processor 32, enable the apparatus 20 to perform tasks as described herein.

In some embodiments, apparatus 20 may also include or be coupled to one or more antennas 35 for transmitting and receiving signals and/or data to and from apparatus 20. Apparatus 20 may further include a transceiver 38 configured to transmit and receive information. For instance, transceiver 38 may be configured to modulate information on to a carrier waveform for transmission by the antenna(s) 35 and demodulate information received via the antenna(s) 35 for further processing by other elements of apparatus 20. In other embodiments, transceiver 38 may be capable of transmitting and receiving signals or data directly.

Processor 32 may perform functions associated with the operation of apparatus 20 including, without limitation, precoding of antenna gain/phase parameters, encoding and decoding of individual bits forming a communication message, formatting of information, and overall control of the apparatus 20, including processes related to management of communication resources.

In an embodiment, memory 34 stores software modules that provide functionality when executed by processor 32. The modules may include, for example, an operating system that provides operating system functionality for apparatus 20. The memory may also store one or more functional modules, such as an application or program, to provide additional functionality for apparatus 20. The components of apparatus 20 may be implemented in hardware, or as any suitable combination of hardware and software.

As mentioned above, according to one embodiment, apparatus 20 may be a mobile device, such as a UE in LTE or LTE-A. In this embodiment, apparatus 20 may be controlled by memory 34 and processor 32 to select a subframe for the first transmission of a preamble based on a configuration broadcast by an eNB, and to repeat the preamble within a preamble repetition period based on a configuration broadcast by an eNB. A periodicity of the PRACH occasion ensures a required number of preamble repetitions within the preamble repetition period. In an embodiment, the configuration for the first transmission comprises the preamble repetition period and subframe offset. According to an embodiment, the configuration for the preamble repetition period comprises the number of repetitions within the repetition period and interval between the preamble repetitions.

In an embodiment, after completing a required number of preamble repetitions within the preamble repetition period, apparatus 20 may be further controlled by memory 34 and processor 32 to start monitoring the EPDCCH transmission from the nearest EPDCCH occasion after the completion of the preamble transmission for scheduling a RAR message. In another embodiment, after completing a required number of preamble repetitions within the preamble repetition period, apparatus 20 may be further controlled by memory 34 and processor 32 to start monitoring EPDCCH transmission from a subframe that is K subframes after the completion of the preamble transmission, where K is a predefined fixed offset.

According to certain embodiments, the PRACH occasion satisfies the following equations: R_R_Period>=CEILING (repetition number of preamble*R_Interval/10,1), and R_SFN mod R_R_Period=R_O_Offset, where R_SFN is the system frame number of the frame where the PRACH occasion occurs, R_R_Period is the preamble repetition period, R_O_Offset is the PRACH occasion offset, and R_interval is the interval between the preamble repetitions.

In one embodiment, the EPDDCH is identified by a RA-RNTI according to the following equation: RA-RNTI=1+L_id+10*f_id, such that 1<=L_id<=EP_R_Period/R_R_Period, where R_R_Period is preamble repetition period, EP_R_Period is EPDCCH repetition period, f_id is the number of PRACH regions that map to the same EPDCCH region, and L_id is the index of each PRACH occasion that maps to the same EPDCCH region. In another embodiment, the EPDDCH is identified by a RA-RNTI according to the following equation: RA-RNTI=1+SFN_PRACH/R_R_Period+10*f_id, where SFN_PRACH is the system frame number of the frame at which PRACH occasion occurs, R_R_Period is preamble repetition period, and f_id is the number of PRACH regions that map to the same EPDCCH region.

Figure 11A:
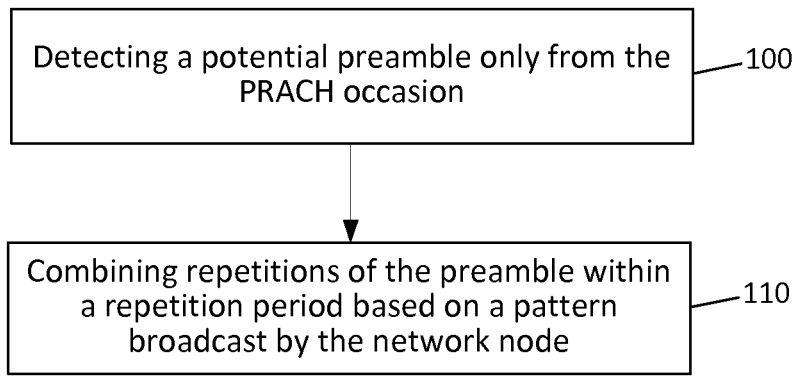
FIG. 11a illustrates a flow diagram of a method according to one embodiment.

FIG. 11a illustrates an example flow diagram of a method, according to one embodiment. In certain embodiments, the method of FIG. 11a may be performed by a network node, such as a base station or eNB. The method may include, at 100, detecting a potential preamble only from the PRACH occasion. At 110, the method may then include combining repetitions of the preamble within a repetition period based on a pattern broadcast by the network node. In certain embodiments, the method may also include sending EPDCCH for scheduling a RAR message from the EPDCCH occasion even if the network node can decode the preamble successfully before receiving a required number of preamble repetitions.

In an embodiment, when multiple PRACH occasions are mapped to a same EPDCCH occasion, the method may include sending separate EPDCCH identified by different RA-RNTI according to the following equation: RA-RNTI=1+L_id+10*f_id, such that 1<=L_id<=EP_R_Period/R_R_Period, where R_R_Period is preamble repetition period, EP_R_Period is EPDCCH repetition period, f_id is the number of PRACH regions that map to the same EPDCCH region, and L_id is the index of PRACH occasions that map to the same EPDCCH region.

According to another embodiment, when there is any overlap among the EPDCCH transmissions corresponding to the preamble transmission of different user equipment, the method may include sending separate EPDCCH identified by different RA-RNTI. The RA-RNTI may be calculated according to the following equation: RA-RNTI=1+SFN_PRACH/R_R_Period+10*f_id, where SFN_PRACH is the system frame number of the frame at which PRACH occasion occurs, R_R_Period is the preamble repetition period (n1, n2, ... nX) (n1=1 frame, n2=2 frames, ... nX=X frames), and f_id is the number of PRACH regions that map to the same EPDCCH region.

Figure 11B:
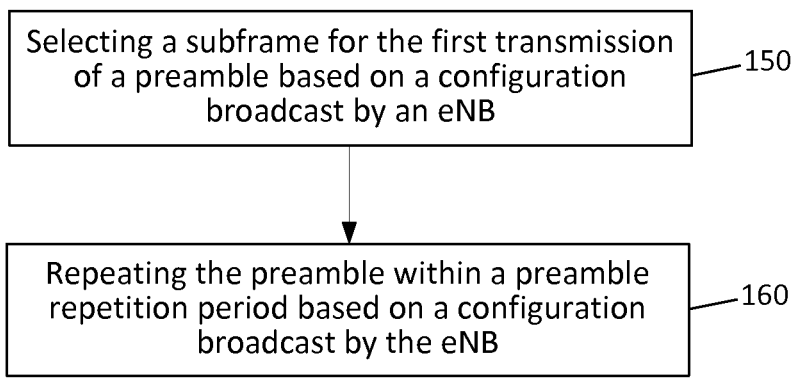
FIG. 11b illustrates a flow diagram of a method according to another embodiment.

FIG. 11b illustrates an example flow diagram of a method, according to one embodiment. In certain embodiments, the method of FIG. 11b may be performed by a device, such as a mobile device or UE. The method may include, at 150, selecting a subframe for the first transmission of a preamble based on a configuration broadcast by an eNB. In an embodiment, the configuration for the first transmission comprises the preamble repetition period and subframe offset. The method may also include, at 160, repeating the preamble within a preamble repetition period based on a configuration broadcast by the eNB. According to an embodiment, the configuration for the preamble repetition period comprises the number of repetitions within the repetition period and interval between the preamble repetitions. A periodicity of the PRACH occasion ensures a required number of preamble repetitions within the preamble repetition period.

In an embodiment, after completing a required number of preamble repetitions within the preamble repetition period, the method may also include starting the monitoring of the EPDCCH transmission from the nearest EPDCCH occasion after the completion of the preamble transmission for scheduling a RAR message. In another embodiment, after completing a required number of preamble repetitions within the preamble repetition period, the method may include starting the monitoring of the EPDCCH transmission from a subframe that is K subframes after the completion of the preamble transmission, where K is a predefined fixed offset.

According to certain embodiments, the PRACH occasion satisfies the following equations: R_R_Period>=CEILING (repetition number of preamble*R_Interval/10,1), and R_SFN mod R_R_Period=R_O_Offset, where R_SFN is the system frame number of the frame where the PRACH occasion occurs, R_R_Period is preamble repetition period, R_O_Offset is the PRACH occasion offset, and R_interval is the interval between the preamble repetitions.

In one embodiment, the EPDDCH is identified by a RA-RNTI according to the following equation: RA-RNTI=1+L_id+10*f_id, such that 1<=L_id<=EP_R_Period/R_R_Period, where R_R_Period is preamble repetition period, EP_R_Period is EPDCCH repetition period, f_id is the number of PRACH regions that map to the same EPDCCH region, and L_id is the index of each PRACH occasion that maps to the same EPDCCH region. In another embodiment, the EPDDCH is identified by a RA-RNTI according to the following equation: RA-RNTI=1+SFN_PRACH/R_R_Period+10*f_id, where SFN_PRACH is the system frame number of the frame at which PRACH occasion occurs, R_R_Period is preamble repetition period, and f_id is the number of PRACH regions that map to the same EPDCCH region.

Figure 12A:
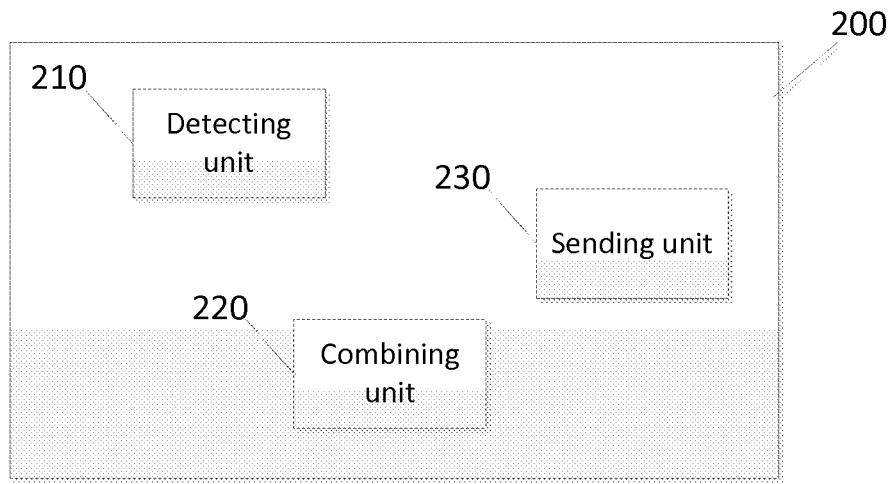
FIG. 12a illustrates a block diagram of an apparatus according to an embodiment.

FIG. 12a illustrates an example block diagram of an apparatus 200, according to another embodiment. In certain embodiments, apparatus 200 may be a network node, such as a base station or eNB. As illustrated in the example of FIG. 12a, apparatus 200 may include a detecting unit 210, combining unit 220, and sending unit 230. Detecting unit 210 may detect a potential preamble only from the PRACH occasion. Combining unit 220 may combine repetitions of the preamble within a repetition period based on a pattern broadcast by the network node. In certain embodiments, sending unit 230 may send EPDCCH for scheduling a RAR message from the EPDCCH occasion even if the network node can decode the preamble successfully before receiving a required number of preamble repetitions.

In an embodiment, when multiple PRACH occasions are mapped to a same EPDCCH occasion, sending unit 230 may send separate EPDCCH identified by different RA-RNTI according to the following equation: RA-RNTI=1+L_id+10*f_id, such that 1<=L_id<=EP_R_Period/R_R_Period. According to another embodiment, when there is any overlap among the EPDCCH transmissions corresponding to the preamble transmission of different user equipment, sending unit 230 may send separate EPDCCH identified by different RA-RNTI. The RA-RNTI is calculated according to the following equation: RA-RNTI=1+SFN_PRACH/R_R_Period+10*f_id, where SFN_PRACH is the system frame number of the frame at which PRACH occasion occurs, R_R_Period is the preamble repetition period (n1, n2, ... nX) (n1=1 frame, n2=2 frames, ... nX=X frames), and f_id is the number of PRACH regions that map to the same EPDCCH region.

Figure 12B:
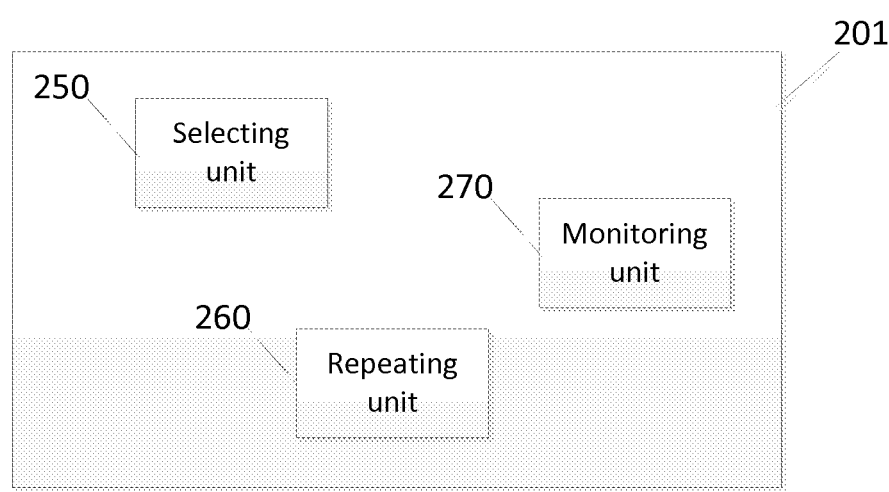
FIG. 12b illustrates a block diagram of an apparatus according to another embodiment.

FIG. 12b illustrates an example block diagram of an apparatus 201, according to another embodiment. In certain embodiments, apparatus 201 may be a device, such as a mobile device or UE. As illustrated in the example of FIG. 12b, apparatus 201 may include a selecting unit 250, repeating unit 260, and monitoring unit 270. Selecting unit 250 may select a subframe for the first transmission of a preamble based on a configuration broadcast by an eNB. Repeating unit 260 may repeat the preamble within a preamble repetition period based on a configuration broadcast by the eNB.

In an embodiment, after completing a required number of preamble repetitions within the preamble repetition period, monitoring unit 270 may start the monitoring of the EPDCCH transmission from the nearest EPDCCH occasion after the completion of the preamble transmission for scheduling a RAR message. In another embodiment, after completing a required number of preamble repetitions within the preamble repetition period, monitoring unit 270 may start the monitoring of the EPDCCH transmission from a subframe that is K subframes after the completion of the preamble transmission, where K is a predefined fixed offset.

The derivation of the specific system frame and subframe for PRACH occasion and for EPDCCH occasion, as provided by embodiments of the invention discussed above, may be specified in future 3GPP specification(s), such as 3GPP 36.211 as supplementary of existing PRACH configuration. The new RA-RNTI calculation may be specified, for example in 3GPP specification 36.321 (for both alternatives of EPDCCH configuration option 1 and EPDCCH configuration option 2). The new EPDCCH search space definition may be specified in 3GPP specification 36.213 (for alternative 1). The new MAC RAR PDU may be defined in 3GPP specification 36.321 for UE in coverage enhancement mode (for alternative 2). The new parameters utilized for PRACH/EPDCCH occasion derivation may be defined as new information elements in system information, for example in 3GPP specification 36.331, which may include:

- R_R_Period is the preamble repetition period (n1, n2, . . . nX) (n1=1 frame, n2=2 frames, . . . nX=X frames)
- R_O_Offset is the PRACH occasion Offset, (0-9), the subframe within the system frame of the PRACH occasion
- R_interval is the interval between the preamble repetitions (n1, n2, . . . nX) (n1=1 subframe, n2=2 subframes, . . . nX=X subframes)
- For EPDCCH configuration option 1:
  - EP_R_Period is the EPDCCH repetition period (n1, n2, . . . nX) (n1=1 frame, n2=2 frames, . . . nX=X frames)
  - EP_O_Offset is the EPDCCH occasion Offset, (0-9), the subframe within the system frame of the EPDCCH occasion
  - EP_R_interval is the interval between the EPDCCH repetitions (n1, n2, . . . nX) (n1=1 subframe, n2=2 subframes, . . . nX=X subframes)
- For EPDCCH configuration option 2:
  - K is the fixed number of subframes after the completion of the preamble transmission
  - The mapping between the frequency allocation for PRACH and the repetition level
  - The mapping between the frequency allocation for EPDCCH and the repetition level.

Embodiments of the invention may provide several advantages and technical improvements. For example, some advantages/improvements include that, by utilizing embodiments of the invention, the eNB can tell the UE from which PRACH occasion a specific preamble ID is detected and thus can avoid unnecessary collision resolution. From the UE point of view, the UE is able to reduce power consumption without such unnecessary contention resolution. Also, the random access latency is reduced.

Programs, also called program products or computer programs, including software routines, applets and macros, may be stored in any apparatus-readable data storage medium and they include program instructions to perform particular tasks. A computer program product may comprise one or more computer-executable components which, when the program is run, are configured to carry out embodiments. The one or more computer-executable components may be at least one software code or portions of it. Modifications and configurations required for implementing functionality of an embodiment may be performed as routine(s), which may be implemented as added or updated software routine(s). Software routine(s) may be downloaded into the apparatus.

Software or a computer program code or portions of it may be in a source code form, object code form, or in some intermediate form, and it may be stored in some sort of carrier, distribution medium, or computer readable medium, which may be any entity or device capable of carrying the program. Such carriers include a record medium, computer memory, read-only memory, photoelectrical and/or electrical carrier signal, telecommunications signal, and software distribution package, for example. Depending on the processing power needed, the computer program may be executed in a single electronic digital computer or it may be distributed amongst a number of computers. The computer readable medium or computer readable storage medium may be a non-transitory medium.

In other embodiments, the functionality of any method or apparatus described herein may be performed by hardware, for example through the use of an application specific integrated circuit (ASIC), a programmable gate array (PGA), a field programmable gate array (FPGA), or any other combination of hardware and software. In yet another embodiment, the functionality may be implemented as a signal, a non-tangible means that may be carried by an electromagnetic signal downloaded from the Internet or other network.

According to an embodiment, an apparatus, such as a node, device, or a corresponding component, may be configured as a computer or a microprocessor, such as single-chip computer element, or as a chipset, including at least a memory for providing storage capacity used for arithmetic operation and an operation processor for executing the arithmetic operation.

One having ordinary skill in the art will readily understand that the invention as discussed above may be practiced with steps in a different order, and/or with hardware elements in configurations which are different than those which are disclosed. Therefore, although the invention has been described based upon these preferred embodiments, it would be apparent to those of skill in the art that certain modifications, variations, and alternative constructions would be apparent, while remaining within the spirit and scope of the invention. In order to determine the metes and bounds of the invention, therefore, reference should be made to the appended claims.

We claim:

1. A method, comprising:
   selecting, by a user equipment, a subframe for a first transmission of a preamble based on a configuration broadcast by an evolved node B; and
   repeating transmission of the preamble within a preamble repetition period based on a configuration received from a broadcast by the evolved node B;
   wherein the configuration for the preamble repetition period comprises one or more of number of repetitions within the repetition period and interval between the preamble repetitions;
   after completing a required number of preamble repetitions within the preamble repetition period, starting monitoring enhanced physical downlink control channel transmission from a subframe that is k subframes after the completion of the preamble transmission for receiving a random access response message, where k is a parameter received through broadcasted system information;
   wherein the enhanced physical downlink control channel is identified by a random access radio network temporary identifier (RA-RNTI) according to the following equation:

RA-RNTI=1+$SFN\_PRACH/R\_R\_Period+10*f\_id$, where SFN_PRACH is the system frame number of the frame at which physical random access channel occasion occurs, R_R_Period is the preamble repetition period, and f_id is the number of physical random access channel regions that map to the same enhanced physical downlink control channel region.

2. The method according to claim 1, wherein the configuration for the first transmission comprises one or more of preamble repetition period or subframe offset.

3. The method according to claim 1, further comprising, after completing a required number of preamble repetitions within the preamble repetition period, starting monitoring enhanced physical downlink control channel (EPDCCH) transmission from the nearest EPDCCH occasion after the completion of the preamble transmission for receiving a random access response (RAR) message.

4. An apparatus, comprising:
at least one processor; and
at least one memory comprising computer program code,
the at least one memory and the computer program code are configured, with the at least one processor, to cause the apparatus at least to
select a subframe for a first transmission of a preamble based on a configuration broadcast by an evolved node B; and
repeat transmission of the preamble within a preamble repetition period based on a configuration received from a broadcast by the evolved node B;
wherein the configuration for the preamble repetition period comprises one or more of number of repetitions within the repetition period and interval between the preamble repetitions;
after completing a required number of preamble repetitions within the preamble repetition period, starting monitoring enhanced physical downlink control channel transmission from a subframe that is k subframes after the completion of the preamble transmission for receiving a random access response message, where k is a parameter received through broadcasted by system information;
wherein the enhanced physical downlink control channel is identified by a random access radio network temporary identifier (RA-RNTI) according to the following equation:

RA-RNTI=1+$SFN$_PRACH/$R\_R$_Period+10*$f$_id, where SFN_PRACH is the system frame number of the frame at which physical random access channel occasion occurs, R_R_Period is the preamble repetition period, and f_id is the number of physical random access channel regions that map to the same enhanced physical downlink control channel region.

5. The apparatus according to claim 4, wherein the configuration for the first transmission comprises one or more of preamble repetition period or subframe offset.

6. The apparatus according to claim 4, wherein the at least one memory and computer program code are further configured to, with the at least one processor, cause the apparatus at least to select the subframe as the physical random access channel (PRACH) occasion for sending the first transmission of the preamble, and wherein the PRACH occasion satisfies the following equations:

$R\_R$_Period>=CEILING(repetition number of preamble*$R$_Interval/10,1), and $R\_SFN$ mod $R\_R$_Period=$R\_O$_Offset, where R_SFN is the system frame number of the frame where the PRACH occasion occurs, R_R_Period is the preamble repetition period, R_O_Offset is the PRACH occasion offset, and R_interval is the interval between the preamble repetitions.

7. An apparatus, comprising:
at least one processor; and
at least one memory comprising computer program code,
the at least one memory and the computer program code are configured, with the at least one processor, to cause the apparatus at least to
detect a potential preamble only from physical random access channel occasion; and
combine repetitions of the preamble within a repetition period based on a pattern broadcast by the apparatus functioning as a network node;
wherein the network node determines a configuration for the preamble repetition period and the configuration for the preamble period comprises one or more of number of repetitions within the repetition period and interval between the preamble repetitions;
wherein after a required number of preamble repetitions within the preamble repetition period is completed, provide an enhanced physical downlink control channel transmission for monitoring from a subframe that is k subframes after the completion of the preamble transmission for receiving a random access response message, where k is a parameter received through broadcasted by system information;
wherein the enhanced physical downlink control channel is identified by a random access radio network temporary identifier (RA-RNTI) according to the following equation:

RA-RNTI=1+$SFN$_PRACH/$R\_R$_Period+10*$f$_id, where SFN_PRACH is the system frame number of the frame at which physical random access channel occasion occurs, R_R_Period is the preamble repetition period, and f_id is the number of physical random access channel regions that map to the same enhanced physical downlink control channel region.

8. The apparatus according to claim 7, wherein the at least one memory and computer program code are configured to, with the at least one processor, cause the apparatus at least to, when multiple physical random access channel (PRACH) occasions are mapped to a same enhanced physical downlink control channel (EPDCCH) occasion, separate EPDCCH identified by different random access radio network temporary identifier (RA-RNTI) according to the following equation:

RA-RNTI=1+$L$_id+10*$f$_id, such that
1<=$L$_id<=$EP\_R$_Period/$R\_R$_Period, where R_R_Period is preamble repetition period, EP_R_Period is EPDCCH repetition period, f_id is the number of PRACH regions that map to the same EPDCCH region, and L_id is the index of PRACH occasions that map to the same EPDCCH region.

9. The apparatus according to claim 7, wherein the at least one memory and computer program code are configured to, with the at least one processor, cause the apparatus at least to, when there is any overlap among the enhanced physical downlink control channel (EPDCCH) transmissions corresponding to the preamble transmission of different user equipment, separate EPDCCH identified by different random access radio network temporary identifier (RA-RNTI), and
wherein the RA-RNTI is calculated according to the following equation:

RA-RNTI=1+$SFN$_PRACH/$R\_R$_Period+10*$f$_id, where SFN_PRACH is the system frame number of the frame at which PRACH occasion occurs, R_R_Period is the preamble repetition period (n1, n2, . . . nX) (n1=1 frame, n2=2 frames, . . . nX=X frames), and f_id is the number of physical random access channel (PRACH) regions that map to the same EPDCCH region.

10. The apparatus according to claim 7, wherein a single random access radio network temporary identifier (RA-RNTI) is predefined for each enhanced physical downlink control channel (EPDCCH) region, and wherein a downlink control information (DCI) scrambled by the RA-RNTI is transmitted in whole 6 physical resource block (PRB) pairs in the EPDCCH region.

11. The apparatus according to claim 7, wherein an item in random access response (RAR) message indicates, for each detected preamble ID, the physical random access channel (PRACH) occasion from which the apparatus detects the preamble ID.

12. The apparatus according to claim 11, wherein, when there are multiple PRACH regions attached to a same enhanced physical downlink control channel (EPDCCH) region, the RAR message also indicates in which PRACH region a specific preamble ID is detected.

13. The method of claim 1, wherein the subframe for the first transmission of the preamble is configured by the evolved node B (eNB).

14. The method of claim 1, wherein the number of repetitions within the repetition period is configured by the evolved node B (eNB).

* * * * *